Patented Jan. 10, 1950

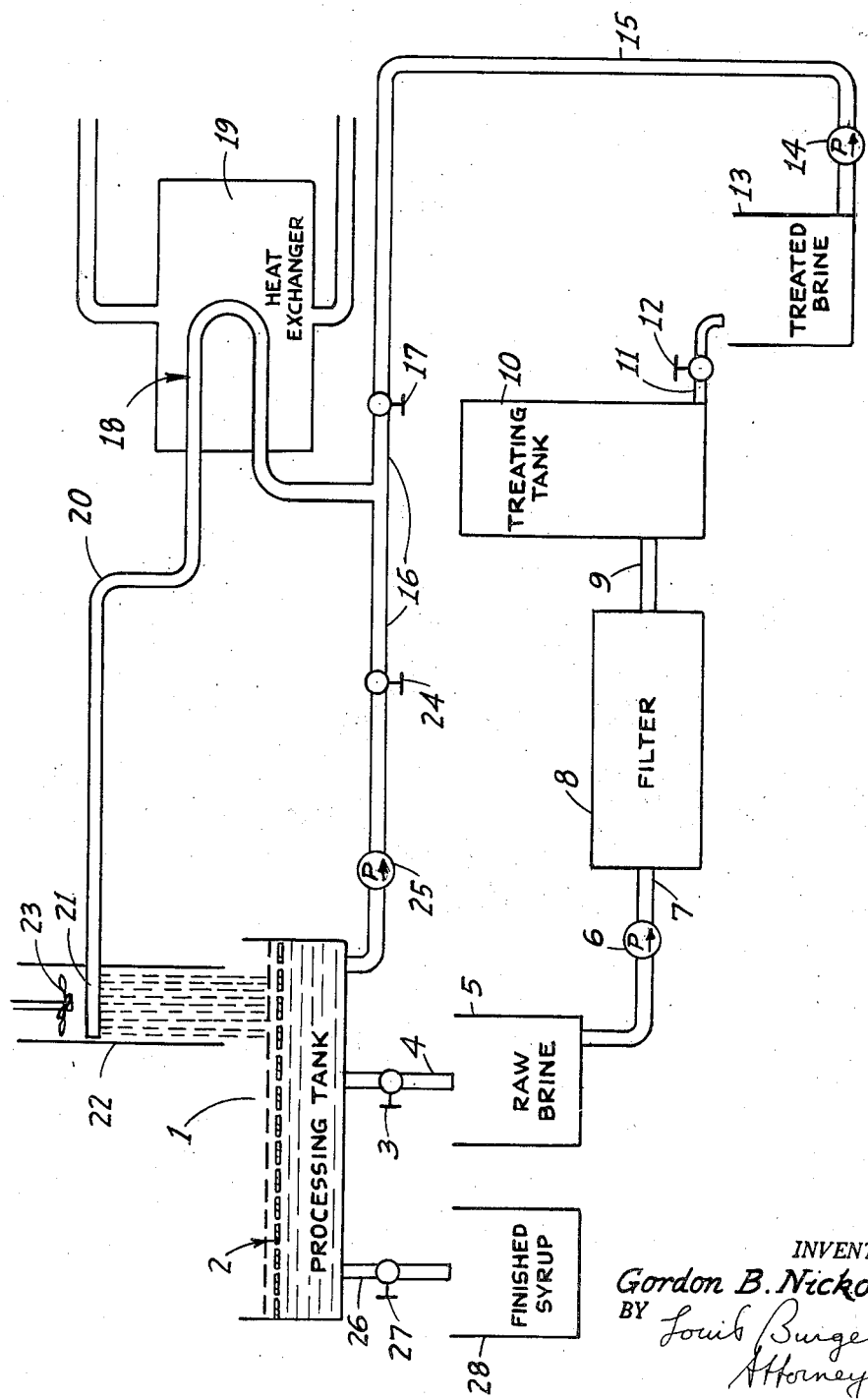

2,494,258

UNITED STATES PATENT OFFICE 2,494,258

PROCESSING CHERRIES PRESERVED IN SULFUR DIOXIDE LIME BRINE

Gordon B. Nickol, Cincinnati, Ohio, assignor to National Distillers Products Corp., a corporation of Virginia Application July 14, 1948, Serial No. 38,739

6 Claims. (Cl. 99—154)

The present invention relates to a novel method for the processing of cherries preserved in sulfur dioxide lime brine, particularly for the preparation of maraschino and candied cherries.

In the preparation of barrelled cherries, the cherries, usually gathered before they have fully matured, are packed into barrels which are then filled with a preservative brine comprising usually about 0.5 to 1.7% sulfur dioxide and 0.4 to 1.2% lime. The cherries are usually ready for further processing after about four to six weeks' storage. At this time the bleached, hardened cherries are removed from the brine, and subjected, after possible stemming, pitting and grading, to treatment for the removal of the sulfur dioxide introduced into them by the preservative brine. The washed cherries are then dyed and syruped, followed by bottling and pasteurization in the case of maraschino cherries, or evaporation and drying of surface moisture in the case of candied cherries. A method for the recovery and utilization of the brine in which the cherries were hardened and preserved is disclosed in my copending application, Serial No. 38,738 entitled "Method for the recovery of cherry juice or syrup cherry brine" filed in the U. S. Patent Office on even date herewith.

Ordinarily, the removal of the sulfur dioxide from the cherries is effected by continuous washing or else by intermittent washing with, for instance, three changes of wash water at 24 hour intervals. Various methods for accelerating this sulfur removal process have been suggested, such as rapid boiling in fresh water for short periods of time or addition of an oxidizing agent. Both of these methods are, however, unsatisfactory, the former because it results in acid-deficient fruit having a gray appearance, and the latter because it requires an additional washing operation. The syruping of the cherries, that is, the increase of the sugar concentration thereof, is effected, in accordance with the known manner of processing barrelled cherries, subsequent to the sulfur dioxide removal. As a rapid increase in sugar concentration will cause excessive shrinkage of the cherries, especially when cherries with stems are processed, and as the desired sugar concentrations of maraschino cherries is between 35 and 50%, the syruping must be carried out very gradually. Thus, this operation alone generally requires, in the case of the known methods, a period of time of about 10 days or even longer, for the preparation of maraschino cherries and a much longer period for the syruping of candied cherries. In view of the three days generally required for sulfur dioxide removal, this signifies a total time of 13 days required in the preparation of maraschino cherries according to the known methods.

I have now discovered a new method by means of which the preparation of maraschino and candied cherries from cherries preserved in sulfur dioxide lime brine may be effected in less than one-fifth the time heretofore required. By the method of my invention shrinkage of the cherries during processing is limited to about 7% and sulfur dioxide content is reduced to substantially less than 350 P. P. M., it being also easily possible by the method of my invention to prepare so-called sulfur-free maraschino cherries, i. e., cherries having a sulfur dioxide content of less than 25 P. P. M. Not only does my process make possible a considerable saving in sugar and flavoring material but the maraschino and candied cherries prepared in accordance therewith have an extremely pleasing, natural cherry flavor comparing excellently with the flavor of the cherries prepared by the known processes. In addition, no excess syrup remains for which a further use must be found.

In accordance with the method of my invention, the cherries, after removal from the preserving brine and possible stemming, pitting and grading, are submerged in a cherry sulfur dioxide lime brine which has previously been subjected to a hydrogen ion exchange treatment as disclosed in my aforementioned copending U. S. patent application. The cherries, while submerged in the brine, are subjected to temperature and pressure conditions adapted to the diffusion of the sulfur dioxide content of the cherries into the surrounding hydrogen ion treated brine, and to the expulsion of this sulfur dioxide from said brine. The syruping of the cherries is effected simultaneously with this sulfur dioxide treatment, in the manner that the sugar concentration of the brine is gradually increased by the addition of sugar or by controlled evaporation of the brine. After the sugar concentration of the cherries has risen to the desired value and the sulfur dioxide content has been sufficiently reduced, the cherries together with the surrounding syrup are packed in bottles and pasteurized. However, if it is desired to prepare candied cherries rather than maraschino cherries, the syrup is drained from the cherries after the sugar concentration has reached the higher value now desired, and the surface moisture of the cherries is thereupon dried. The total time required for the preparation of maraschino cherries according to my method is only 2½ days from start to finished cherries.

In the carrying out of the method of my invention, the barrels of cherries are rolled from storage to processing tank 1 where the barrel heads are removed and the cherries and brine dumped into the tank. Perforated plate 2 is submerged in the brine, on top of the cherries, and fastened in this position to the walls of said tank, this plate serving to keep the cherries under the liquid level during the following processing. Valve 3 is then opened and the brine drained through pipe 4 into tank 5. The brine is then transferred by pump 6 through pipe 7 and through filter 8 and pipe 9 into tank 10 in which it is contacted with hydrogen ion exchange material such as Amberlite IR-100 until the pH has been reduced to about 1.5 and in any event to from 1.5 to 3.0 whereupon it is discharged through pipe 11 controlled by valve 12 into tank 13. From tank 13 it is transferred by pump 14 through pipe 15 and through pipe 16 controlled by valve 17 (valve 24 being closed) through heater coil 18 in heat exchanger 19 by which it is heated to a temperature of at least 120° F. and preferably at least 130° F. passing thence through pipe 20 into distributor head 21 in column 22 by which it is sprayed downwardly through an ascending current of air provided by fan 23. The current of air carries off sulfur dioxide. After all the treated brine has been returned to tank 1 valve 17 is closed and valve 24 in pipe 16 is opened whereupon the brine is circulated by pump 25 through heater coil 18 and distributor head 21. Sulfur dioxide and water are continuously removed in column 22. The resulting loss of water from the brine in tank 1 is compensated for the controlled addition of sugar solution to tank 1 and this is continued either continuously or intermittently until the desired removal of sulfur dioxide and water are obtained and the syrup has the desired concentration of solids. The concentration of the sugar syrup added is so controlled that the cherries are at all times covered by the liquid in tank 1. When the final desired concentration is reached the finished syrup is drained from the cherries in tank 1 by pipe 26 controlled by valve 27 into tank 28. Additional flavor and color if desired may be added to the syrup in tank 28. The cherries are then emptied from tank 1, for example, through a manhole (not shown) and thereupon filled into bottles, covered with the syrup from syrup tank 28, and then pasteurized, for instance, for 30 minutes at 170° F. If it is desired to prepare candied cherries, the above operations are continued until the syrup reaches a sugar concentration of about 80%, whereupon the cherries are removed from the syrup and dried free of surface moisture.

Although the specific example of my invention given above contemplates surface evaporation for the removal of the sulfur dioxide, it is evident that the liquid may also be subjected to boiling, either at atmospheric or at reduced pressure, or else that the surface evaporation may be effected under any temperature and pressure conditions, without departing from the generic concept of my invention. However, surface evaporation at 140° F. is preferred since this temperature is high enough to assure a convenient rate of $SO_2$ removal, diffusion of sulfur dioxide from cherries into liquor being approximately 6 times as rapid at 140° F. as at 70° F., while low enough not to cause excessive shrivelling of even cherries with stems. However, the cherries may, for instance, be held overnight in cherry brine which has been subjected to a hydrogen ion exchange treatment, and thereupon vacuum boiled for 30 minutes at 170° C.

The distribution of the syrup and of the brine over the surface of the cherry processing tank may, of course, also be carried out independently of each other, which may for some purposes be preferable. At any event, the spraying of the treated brine into the airflow passing over the surface of tank 1 assures almost complete removal of the sulfur from the liquor before it is recirculated over the cherries, thus assuring maximum diffusion of sulfur dioxide to circulating liquor.

The foregoing description is for purposes of illustration and not of limitation and it is therefore my intention that the invention be limited only by the appended claims or their equivalent wherein I have endeavored to claim broadly all inherent novelty.

I claim:

1. Method for the treatment of cherries preserved in sulfur dioxide and lime brine which comprises contacting said cherries with a sulfur dioxide and lime brine derived from preserving such cherries, which brine was treated with a hydrogen ion exchange material to remove calcium ions and yield sulfur dioxide in said brine, and progressively removing sulfur dioxide during said contacting.

2. Method according to claim 1 wherein said hydrogen ion exchange material treatment develops a pH not exceeding 3 in said brine.

3. Method according to claim 1 which comprises in addition progressively removing water and adding sugar during said contacting.

4. Method for the treatment of cherries preserved in sulfur dioxide and lime brine which comprises contacting said cherries with a sulfur dioxide and lime brine derived from preserving such cherries, which brine was treated with a hydrogen ion exchange material to remove calcium ions and yield sulfur dioxide in said brine, and progressively removing sulfur dioxide by vaporization during said contacting.

5. Method according to claim 4 wherein said hydrogen ion exchange material treatment develops a pH not exceeding 3 in said brine.

6. Method according to claim 4 which comprises in addition progressively removing water and adding sugar during said contacting.

GORDON B. NICKOL.

REFERENCES CITED

The following references are of record in the file of this patent:

UNITED STATES PATENTS

| Number | Name | Date |
|---|---|---|
| 2,019,030 | Tucker | Oct. 29, 1935 |
| 2,151,883 | Adams | Mar. 28, 1939 |

OTHER REFERENCES

"Demineralizing Solutions," by Tiger et al., Industrial & Eng. Chem., Feb. 1943, pp. 186 to 191.

Certificate of Correction

January 10, 1950

Patent No. 2,494,258

GORDON B. NICKOL

It is hereby certified that errors appear in the printed specification of the above numbered patent requiring correction as follows:

Column 1, line 25, after the word "syrup" insert *from*; lines 47 and 48, for "concentrations" read *concentration*; and that the said Letters Patent should be read with these corrections therein that the same may conform to the record of the case in the Patent Office.

Signed and sealed this 25th day of April, A. D. 1950.

[SEAL]

THOMAS F. MURPHY,
*Assistant Commissioner of Patents.*